Aug. 25, 1942.    A. H. THOMPSON    2,294,056
LOCK-NUT
Filed April 6, 1940
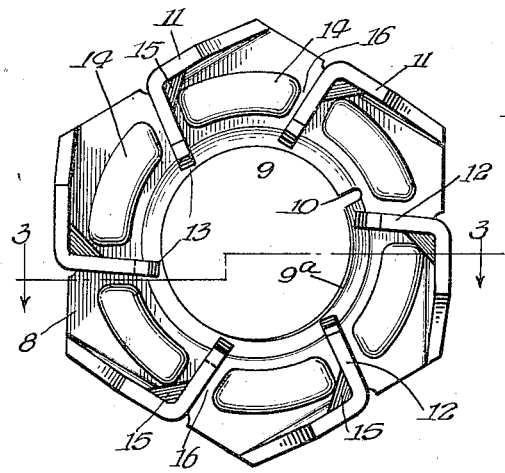
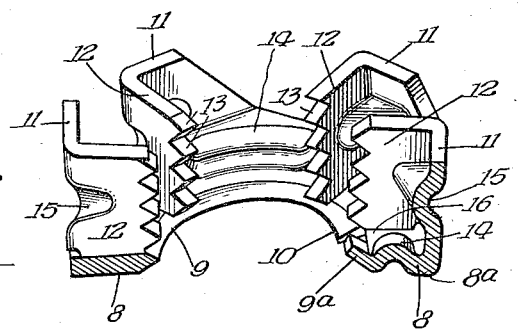
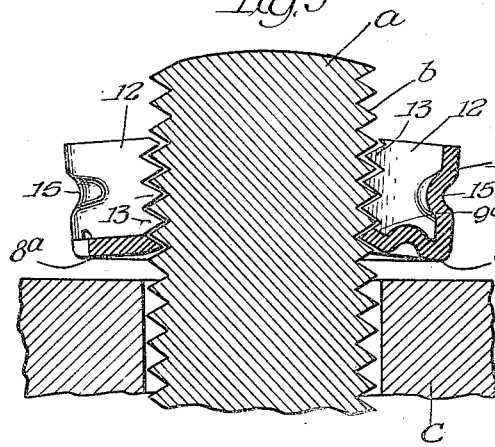
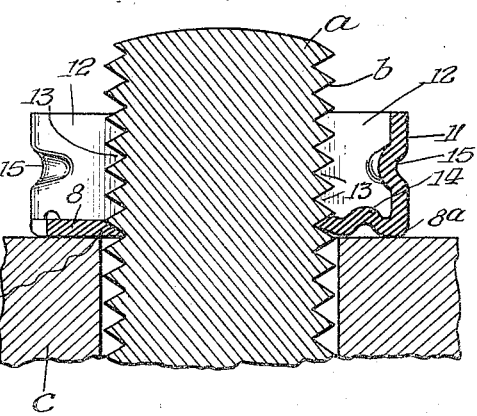
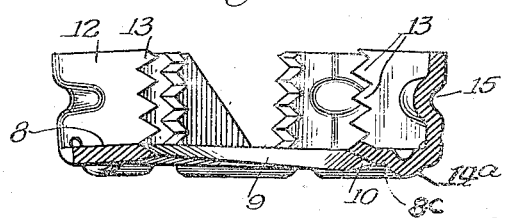
Inventor
Arthur H. Thompson
By Fred Gorlach
his Atty.

Patented Aug. 25, 1942

2,294,056

UNITED STATES PATENT OFFICE 2,294,056

LOCK NUT

Arthur H. Thompson, Chicago, Ill., assignor to Thompson-Bremer & Co., Chicago, Ill., a corporation of Illinois Application April 6, 1940, Serial No. 328,199

8 Claims. (Cl. 151—14)

The invention relates to self-locking nuts.

One object of the invention is to provide an improved one-piece lock-nut which is formed of plate metal, is adapted to be applied to a screw or like externally threaded element, and comprises a base for engaging the work and integral locking tongues which extend substantially radially inwards from the outer margin of the base and in which the outer margin of the base is so shaped that it will fulcrum on the work as the nut is turned into engagement therewith and cause the tongues to be jammed radially against the side-faces of a plurality of the convolutions of the thread of the screw without depending on the inherent spring in the tongues to lock the nut.

Another object of the invention is to provide an improved lock-nut of this type in which the inner ends of the locking tongues are normally free from spring-pressure against the screw-thread so that the nut can be freely turned around the screw without substantial friction or retardance until the nut encounters the work.

Other objects of the invention and the various advantages and characteristics of the present nut will be apparent from a consideration of the following detailed description.

The invention consists in the several novel features which are hereinafter set forth and are more particularly defined by claims at the conclusion hereof.

In the drawing: Fig. 1 is a plan view of a locknut embodying the preferred form of the invention. Fig. 2 is a sectional or fragmentary perspective of the nut shown in Fig. 1. Fig. 3 is a section taken on the line 3—3 of Fig. 1 and showing the nut on, and freely rotatable around, a screw and before it has been brought into engagement with the work. Fig. 4 is a similar section showing the nut after it has engaged the work and while it is firmly locked against rotation relatively to the screw by the tongues. Fig. 5 is a sectional perspective illustrating a nut embodying a modified form of the invention.

The invention is exemplified in a self-locking lock-nut which is adapted to be applied to a screw $a$, and is formed of a blank of flat sheet or plate metal of sufficiently heavy stock to function as a nut. The nut comprises a hexagonal base 8 which extends transversely of the axis of the screw $a$ and serves as the body of the nut. The lower face of the base is adapted to abut against the work $c$, which may be any element through which a bolt or screw extends, or an ordinary nut. The base is provided with a central hole 9, the margin 9a of which is notched, as at 10, and is helically bent or offset upward from the bottom face of the base to fit into substantially one complete convolution of the V-shaped groove of the screwthread $b$ on the screw $a$. Each side of the hexagonal base 8 has an upstanding side-flange 11 extending at substantially right angles to the plane of the plate and formed by bending the blank from which the nut is formed upwardly from the outer marginal portions of the base. Each upstanding flange 11 is provided, at one of its ends with an upstanding tongue 12, which is formed by bending a strip of the stock radially inward from one end of the flange. The tongues 12 are of substantially the same height as the upstanding flanges 11 and are sufficient to lap a plurality of the convolutions of the screw-thread $b$ on the screw $a$. The inner end of each tongue 12 is provided with a plurality of V-shaped teeth 13 which extend longitudinally of the screw and are shaped to conform substantially to the V-shaped cross-section of the groove in thread $b$ and are preferably sufficient in number for engagement with a sufficient number of the convolutions of the groove $b$ for effectively gripping the screw when radially inward pressure is applied to the tongue. The teeth 13 on the inner ends of tongues 12 are normally spaced away from the screw to provide slight clearance between the teeth and the screw and to avoid pressure-engagement with the screw-thread. Therefore, the nut normally may be freely turned on the screw in either direction, as illustrated in Fig. 3. The teeth at the inner end of each tongue 12 are offset relatively to the teeth on the adjacent tongues in the direction of the axis of the hole 9 and in such manner that the teeth as a group are helically arranged in phase with, or conformably to, the spiral of the thread of the screw $a$.

In practice it has been found to be objectionable to provide resilient tongues which are normally pressed against or scrape the thread while the nut is being turned on the screw. In the use of screws which are plated or provided with an ornamental finish, scraping destroys the plating or finish. It is also advantageous to avoid pressure engagement between the resilient tongues and the screw-thread so the nut can be freely turned on the screw until the nut meets the resistance of the work. For these reasons, the teeth 13 on the tongues 12 are normally spaced from the inclined side-faces of the screw-thread when the nut is on a screw as shown in Fig. 3.

The base 8 is dished upwardly or otherwise shaped to cause its marginal portions 8ª adjacent the flanges 11 and the outer ends of the tongues 12 to engage the work in advance of its inner portion around the hole 9. The function of this formation is to cause the outer marginal portion of the base to engage and fulcrum on the work so that as the rotation of the nut is continued and the helical margin 9ª around hole 9 is forced toward the work, the base 8 will be flexed or flattened so the upstanding flanges 11 which are normally flared upwardly, will swing inwardly toward the axis of the screw and will also fulcrum on the portions 8ª of the base. This movement of the base and flanges will cause the flanges 11 to swing inwardly toward the axis of the screw, as shown in Fig. 3. The tongues 12 are moved radially inward and jam the teeth 13 into several convolutions of the groove and into wedging relation with the side-faces of the screw-thread b. The teeth 13 of the tongues will thus be wedged against the angular side-faces of the screw-thread by positive pressure applied to the base 8 by the work and through the flanges 11 and tongues 12 to the teeth. This will cause the nut to be securely locked against rotation away from the work. The lower edges of the tongues abut against the upper face of base 8 so the forces of the base will be transmitted directly to the tongues as well as through the flanges 11. This exemplifies a lock-nut in which the teeth of the upstanding tongues are forced into locking engagement with the screw by the bending or flattening of the base 8 between its outer margin which engages the work and its inner margin 9ª around the hole 9 and the translation of said bending into radially inward forces when applied to tongues 12, substantially in the planes of the longitudinal sides of the tongues rather than transversely which results in positively locking the nut against reverse rotation on the screw. The gripping forces are not dependent upon the resiliency of the tongues. Preferably, the tongues 12 are slightly off the dead centers between their outer ends and the axis of the screw and in the direction opposite that in which the nut is rotated onto the screw to prevent them from being sprung across the dead center by extraordinary force applied in the direction in which the nut rotates off the screw. By having the tongues disposed in off or non-dead center relation the tongues, even though in contacting relation with the screw, do not prevent the nut from being turned tightly against the work. When the nut has been tightened against the work, as illustrated in Fig. 4, the teeth 13 will be jammed against the inclined side-faces of the several convolutions of the screw-thread and by forces directed longitudinally of the tongues and this will effectively lock the nut against rotation away from the work. In the event that removal of the nut from the screw is desired, this may be effected by a suitable tool or wrench, for spreading the tongues sufficiently to disengage the teeth 13 from the inclined faces of the screw-thread such, for example, as the wrench forming the subject matter of United States Patent No. 2,270,092 granted to me on January 13, 1942.

In order to stiffen the base 8 between its outer margin and the helical margin or thread 9ª around hole 9 and insure the fulcruming of the flanges 11 and tongues 12 on the work as the nut is turned into engagement with the work, the base 8 is provided with upwardly embossed portions 14 between the tongues 12. These embossed portions are so positioned or arranged as to leave sufficient clearance for the slight flexing of the tongues in removing the nut from the screw. They also limit the circumferential flexing of the tongues. The lower edges of the tongues abut against the flat portions 16 between the ends of the embossed portions 14. The corners between the upstanding flanges 11 and tongues 12 are also indented, as at 15, to form brace portions which stiffen these corners to insure the inward radial movement of the tongues from forces applied to the base.

In the modification shown in Fig. 5 the base 8ᶜ is formed with downwardly embossed portions 14ª in lieu of the upwardly embossed portions illustrated in Figs. 1 to 4. The construction of the flanges, tongues and teeth on the tongues is the same as in the lock nut of Figs. 1 to 4. In this modified construction, the work engages the lower faces of the embossed portions 14ª adjacent the outer margin of the base and causes the flanges 11 and tongues 12 to fulcrum so the teeth on the tongues will engage the side-faces of the screw-thread, as before described.

The invention exemplifies a one-piece lock-nut formed of a plate of metal in which the tongues and the teeth thereon are normally out of pressure-engagement with the screw-thread to permit the nut to be freely turned in either direction on the screw and which, when the work is engaged by the nut, are forced radially inward by pressure longitudinally of the tongues positively to jam the teeth into the groove and against the side-faces of the screw-thread and effectively lock the nut against rotation. While locking action of the nut has been described in connection with rotation of the nut on the screw, it will be obvious that the same result is accomplished if the screw is turned and the nut is stationary.

The invention is not to be understood as restricted to the details set forth, since these may be modified within the scope of the appended claims, without departing from the spirit and scope of the invention.

Having thus described the invention, what I claim as new and desire to secure by Letters Patent is:

1. As a new article of manufacture, a lock nut in the form of a stamping, adapted for use on a screw and comprising a plate provided with a central hole therein for the screw, and a plurality of elongated tongues adjacent one side of the plate, extending in an annular series around said hole, having their outer ends joined to the outer marginal portion of the plate and their side faces extending substantially at right angles to said plate, and provided at their inner ends with teeth helically arranged conformably to the spiral of the thread of the screw and shaped to fit between and engage the inclined side faces of the thread, the plate having a helical part around the central hole extending in the direction of the tongues and interfitting with the thread of the screw and also having on the other side thereof and outwards of the helical part a fulcrum type work-engaging part spaced axially from said helical part, and being adapted when rotated on the screw so that the work-engaging part thereof is brought into firm engagement with the work to flex axially in such manner that the tongues are moved inwards towards the screw into a position wherein the inner teeth equipped ends thereof are in jammed or contacting relation with said side faces of the thread, the tongues being laterally flexible and extending inwards in such direction that their teeth equipped ends after being brought into engagement with the thread will slide on the side faces of the thread when the nut is turned further towards the work and will bite into said side faces when the nut is urged rotatively in the opposite direction.

2. As a new article of manufacture, a lock nut in the form of a metal one-piece stamping, adapted for use with a screw and comprising a plate provided with a central hole for the screw, and a plurality of elongated tongues adjacent one side of the plate, extending in an annular series around said hole, having their outer ends joined to the outer marginal portion of the plate and their side faces extending substantially at right angles to the plate, and provided at their inner ends with teeth normally free from the thread of the screw and helically arranged conformably to the spiral of the thread and shaped to fit between and engage the inclined side faces of said thread, the plate having a helical part around the central hole extending in the direction of the tongues and interfitting with the thread of the screw and also having on the other side thereof and outwards of the helical part a fulcrum type protruding work-engaging part, and being adapted when rotated on the screw so that the work-engaging part thereof is brought into firm engagement with the work to flex axially in such manner that the tongues are moved inwards towards the screw into a position wherein the inner teeth equipped ends thereof are jammed against the side faces of the thread, the tongues being laterally flexible and extending inwards in such direction that their teeth equipped ends, after being brought into engagement with the thread due to flexing of the plate upon engagement of said work-engaging part with the work, will slide on the side faces of the thread when the nut is turned further towards the work and will bite into said side faces when the nut is urged rotatively in the opposite direction.

3. As a new article of manufacture, a lock nut in the form of a sheet metal stamping, adapted for use with a screw and comprising a plate provided with a central hole therein for the screw, and a plurality of elongated tongues adjacent one side of the plate, extending in an annular series around the hole in the plate, having their outer ends joined to the outer marginal portion of the plate and their side faces extending at substantially right angles to said plate, and provided at their inner ends with teeth helically arranged conformably to the spiral of the thread of the screw and shaped to fit between and engage the inclined side faces of the thread, the plate having a helical part around the central hole extending in the direction of the tongues and interfitting with the thread of the screw and also having on the other side thereof and outwardly of the helical part a fulcrum type work-engaging part spaced axially from said helical part, and being adapted when rotated on the screw so that the work-engaging part thereof is brought into firm engagement with the work, to flex axially in such manner that the tongues are moved inwards towards the screw into a position wherein the inner teeth equipped ends thereof are jammed against the side faces of the thread, the tongues being laterally flexible and extending inwards in such direction that their teeth equipped ends, after being brought into engagement with the thread, will slide on the side faces of the thread when the nut is turned further towards the work and will bite into said side faces when the nut is urged rotatively in the opposite direction, said plate being provided with means for limiting lateral flexing of the tongues.

4. As a new article of manufacture, a lock nut in the form of a stamping, adapted for use with a screw and comprising a plate provided with a central hole for the screw, and a plurality of elongated tongues adjacent one side of the plate, extending in an annular series around said hole, having their outer ends joined to the outer marginal portion of the plate and their side faces extending substantially at right angles to the plate and provided at their inner ends with teeth helically arranged conformably to the spiral of the thread and shaped to fit between and engage the inclined side faces of the thread, the plate having a helical part around the central hole extending in the direction of the tongues and interfitting with the thread of the screw and also having on the other side thereof and adjacent its said outer marginal portion a fulcrum type protruding work-engaging part and being adapted when rotated on the screw so that said work-engaging part engages the work, to flex axially in such manner that the tongues are moved inwards towards the screw into a position wherein said inner teeth equipped ends thereof are jammed against said side faces of the thread, the tongues being laterally flexible and extending inwards in such direction that their teeth equipped ends, after being brought into engagement or jammed relation with the thread, will slide on the side faces of the thread when the nut is turned further towards the work and will bite into said side faces when the nut is urged rotatively in the opposite direction, said plate being provided between the hole and its said outer marginal portion with embossed portions extending in the direction of the tongues and serving to limit lateral flexing of said tongues.

5. As a new article of manufacture, a lock nut in the form of a sheet metal stamping, adapted for use with a screw and comprising a polygonal plate provided with a central screw receiving hole, right angle flanges extending in one direction from its outer marginal portion and a plurality of elongated tongues extending inwardly from the flanges and in an annular series around said hole, and having the side faces thereof extending substantially at right angles to the plate, the tongues being each provided at its inner end with an axially extending series of teeth and the series of teeth as a group being helically arranged conformably to the spiral of the thread of the screw and shaped to fit between and engage the inclined side-faces of a plurality of convolutions of the thread, the plate having a helical part around the central hole extending in said one direction and interfitting with the thread of the screw and also having adjacent its outer marginal portions a fulcrum type work-engaging part extending in the opposite direction, and being adapted when rotated on the screw so that the work-engaging portion thereof is in engagement with the work, to flex axially in such manner that the tongues are moved inwards towards the screw into a position wherein the inner teeth equipped ends thereof are jammed against the side faces of the thread, the tongues being laterally flexible to a limited extent and extending inwards in such direction that their teeth equipped inner ends, after being brought into jammed engagement with the thread, will slide on the side faces of the thread when the nut is turned further toward the work and will bite into said side faces when the nut is urged rotatively in the opposite direction.

6. As a new article of manufacture, a lock nut in the form of a stamping, adapted for use with a screw and comprising a polygonal plate provided with a central hole for the screw, right angle flanges along its outer marginal portions and extending in one direction therefrom, a plurality of elongated tongues extending inwardly from the flanges and in an annular series around the hole, having the side faces thereof extending substantially at right angles to the plate, and provided at their inner ends with axially extending teeth helically arranged conformably to the spiral of the thread of the screw and shaped to fit between and engage the inclined side faces of a plurality of convolutions of the thread, and brace formations between the flanges and the tongues, the plate having a helical part around the central hole extending in the direction of the tongues and interfitting with the thread of the screw and also having on the side opposite the tongues and adjacent its said marginal portions a fulcrum type work-engaging part spaced axially from the helical part, and being adapted when rotated on the screw so that the work engaging part thereof is brought into firm engagement with the work, to flex axially in such manner that the tongues are moved inwards towards the screw into a position wherein the inner teeth equipped ends thereof are jammed against the side faces of the thread, the tongues being laterally flexible to a limited extent and extending inwards in such direction that their teeth equipped ends, after being brought into engagement with the thread, will slide on the side faces of the thread when the nut is rotated further towards the work and will bite into said side faces when the nut is urged rotatively in the opposite direction.

7. As a new article of manufacture, a lock nut for use on a screw, formed of a sheet metal stamping and comprising an upwardly dished plate provided with a central hole for the screw, upstanding flanges at its outer marginal portions and a plurality of elongated tongues extending inwardly from the flanges and in an annular series around said hole and having the side faces thereof extending substantially at right angles to the plate, the tongues being provided at their inner ends with teeth helically arranged conformably to the spiral of the thread of the screw and shaped to fit between and engage the inclined side faces of the thread, the plate having an upwardly extending helical part around the central hole interfitting with the thread of the screw and being adapted when rotated on the screw into engagement with the work, to flex axially in such manner that the tongues are moved inwards towards the screw into a position wherein the teeth at the inner ends thereof are jammed against the sides of the thread, the tongues being laterally flexible and extending inwards in such direction that their teeth equipped ends, after being brought into engagement with the thread, will slide on the side faces of the thread when the nut is turned further towards the work and will bite into said side faces when the nut is urged rotatively in the opposite direction.

8. As a new article of manufacture, a lock nut in the form of a stamping, adapted for use on a screw and comprising a plate provided with a central hole for the screw, and a plurality of elongated tongues adjacent one side of the plate, extending in an annular series around said hole, having their outer ends joined to the outer marginal portion of the plate and their side faces extending substantially at right angles to said plate, and provided at their inner ends with teeth helically arranged conformably to the spiral of the thread and shaped to fit between and engage the inclined side faces of the thread, the plate having a helical part around the central hole extending in the direction of the tongues and interfitting with the thread of the screw and also having adjacent its outer marginal portion fulcrum type embossed work-engaging parts protruding oppositely to the helical part, and being adapted when rotated on the screw so that said work-engaging parts thereof are brought into firm engagement with the work, to flex axially in such manner that the tongues are moved towards the screw into a position wherein the teeth equipped ends thereof are in jammed or contacting relation with the side faces of the thread, the tongues being laterally flexible and extending inwards in such direction that their teeth equipped ends, after being brought into engagement with the thread, will slide on the side faces of the thread when the nut is turned further towards the work and will bite into said side faces when the nut is urged rotatively in the opposite direction.

ARTHUR H. THOMPSON.